June 21, 1966  J. LUDEMANN ETAL  3,257,572
STATORS FOR POLYPHASE SMALL ELECTRIC MOTORS
Filed March 14, 1960
Fig. 1a      Fig. 2a     Fig. 2b
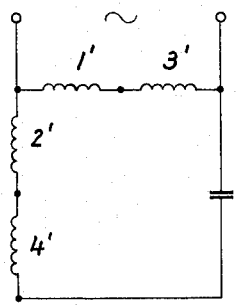 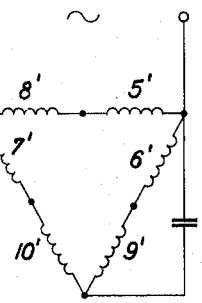 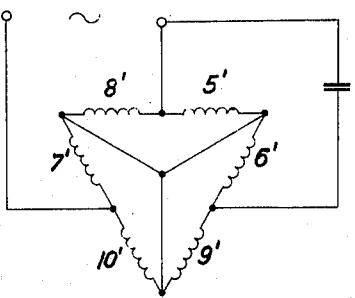
Fig. 1     Fig. 2
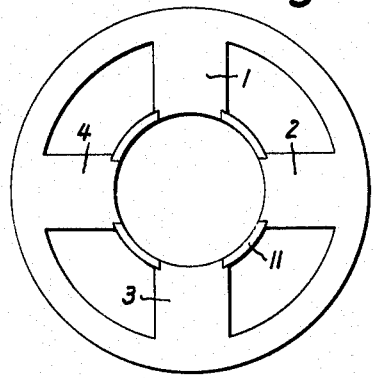 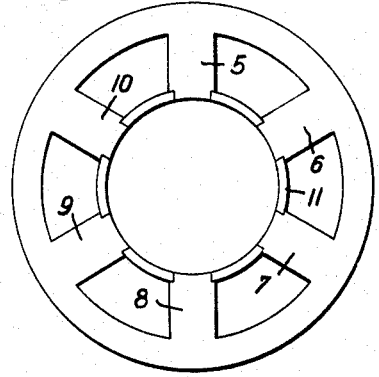
Fig. 3     Fig. 4
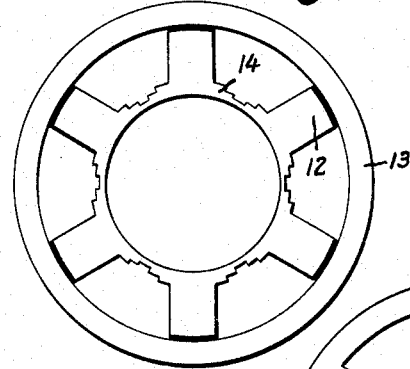 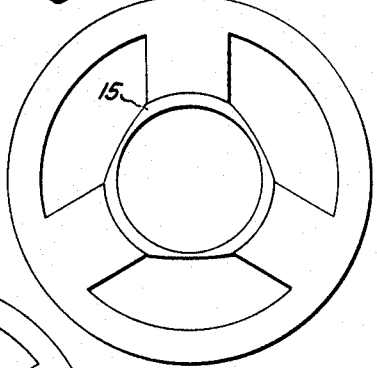
Fig. 5
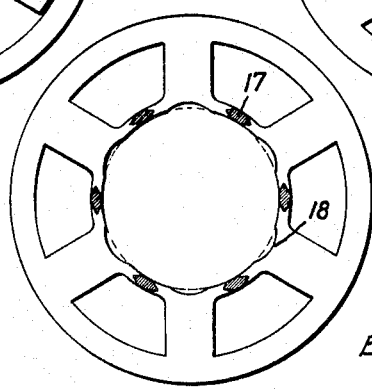
Inventors
JOSEPH LUDEMANN
HEINZ HEILMANN
By Toulmin & Toulmin
Attorneys

United States Patent Office 3,257,572
Patented June 21, 1966

3,257,572
STATORS FOR POLYPHASE SMALL ELECTRIC MOTORS
Joseph Ludemann and Heinz Heilmann, Oldenburg, Germany, assignors to Licentia Patent-Verwaltungs-G.m.b.H., Frankfurt am Main, Germany
Filed Mar. 14, 1960, Ser. No. 14,701
Claims priority, application Germany, Mar. 16, 1959, L 32,747
7 Claims. (Cl. 310—190)

The present invention relates to electric motors. More in particular, the present invention relates to stators for polyphase small electric motors, and more particularly still the invention relates to the construction of the stators of polyphase small motors with salient poles for pairs of poles $p$ whose number is greater than 1. ($p > 1$.)

It is known to construct small two-phase induction motors as well as single-phase induction motors developed therefrom and having an auxiliary phase capable of being switched off, and service condenser motors having a permanently switched on auxiliary phase, in such a manner that each phase is provided with a pair of salient poles corresponding to the number of pairs of poles $p$ and which are connected by pole wedges serving as leakage bridges. Such motors have therefore twice as many salient poles as they have pairs of poles; in the case of shaded pole motors, the shaded pole is to be considered as a salient pole. Thus a two-pole motor in this construction requires four, and a four-pole motor eight salient poles. The constructional assembly may, as is known, be effected in various ways, for example, by pressing into a hole in the stator a laminated pole star with exciter coils slipped thereon.

The use of the above-described two-phase principle with one pair of poles per phase is, in the case of miniature motors, limited on account of production-technical and electrical reasons, especially when it is a question of pairs of poles $p > 1$. Amongst other things, the utilization of the winding space is so unfavorable in this case that the motor becomes rather poor in operation.

Extensive experiments have proved conclusively that the three-phase system is superior both from a production-technical as well as from an electrical point of view to the two-phase system in the construction described, particularly in the case of motors of smaller dimensions.

It is the object of the present invention to provide a stator for small polyphase motors which allows for the construction of particularly small motors and which results in a considerable saving in material and construction.

Other objects and advantages will become apparent as the description of the invention proceeds.

The above-mentioned disadvantages are avoided, and the objects and advantages are accomplished by the present invention, according to which the principle of salient poles with pole bridges between the poles is applied to the three-phase motor and its modified form as single-phase motor, for example in Steinmetz connection.

The advantage of this interlinked system is that in the case of a motor with a number of pairs of poles $p$, only 3 times 2p:2 poles are required instead of 4 times 2p:2. The saving in salient poles as well as exciter coils therefore amounts to 25%. Apart from the winding and production-technical advantages attained, this principle enables to produce motors which are still smaller than motors constructed according to the two-phase principle.

The three-phase motor as well as the single-phase motor operated in Steinmetz connection developed therefrom consequently possess, as compared with the ordinary two-phase induction motor, three poles for the speed of 3000 revolutions per minute, six poles for 1500 revolutions per minute, and nine poles for 1000 revolutions per minute with a 50-cycle current.

The invention will be more fully appreciated upon the following description of the accompanying drawings, wherein FIGURE 1 shows the known construction of a stator for a single-phase motor with main and auxiliary phases;

FIGURE 1a being a diagram of the circuit arrangement therefor;

FIGURE 2 shows the stator according to the invention for a motor with two pairs of poles;

FIGURE 2a is a diagram showing the circuit arrangement therefor and

FIGURE 2b a diagram of the circuit arrangement in the case of a Dahlander connection;

FIGURE 3 shows a stator according to FIGURE 2 but with pole star;

FIGURE 4 is a stator of a single-pole motor with pole ring, and

FIGURE 5 a stator according to FIGURE 2 but with pole tips and slot closing bridges.

The constructional design offers the same or similar possibilities of application as in the case of the ordinary single-phase and two-phase induction motors with salient poles. The poles can be arranged in a yoke ring or also form an inner spider which is fitted in a yoke ring. In the first instance, however, the construction with solid pole bridges between the edges of the poles must, for electrical reasons, give way to the construction with a laminated pole ring inserted in the bore in the pole piece, that is centrally between the poles.

In the present case the pole bridge has a somewhat different significance than in the case of the single-phase and two-phase induction motors and the shaded pole motor. Whereas here the flux from pole to pole via the pole bridge dominates, there the flux from pole via the pole bridge to the rotor is more important. The result of this is that in a further possible construction, namely that of the so-called stamped-on pole bridges similar to the construction without pole bridges in the case of shaded pole motors wherein the stator plate is in one piece and the pole bridges are interrupted by a slot for introducing the winding, this slot is to be ferromagnetically closed. This is effected by inserting a kind of magnetically conductive slot wedge, the cross-section of which, corresponding to the slot, may be circular, elliptical, hexagonal or the like.

A special shape given to the pole wedge enables it to carry out the additional function it has to perform. The thickness from pole core to pole core is preferably varied gradually or in steps so that useful flux under pole core and pole wedge passing over to the rotor is divided as far as possible in sine-shape over the air gap. Moreover, the pole faces and the pole bridges are preferably so constructed that the air gap or clearance between them and the rotor varies in size so that the content of higher field-harmonics remains as small as possible.

By shaping the pole wedges and the air gap the motors can be adapted to a certain extent to meet special working conditions.

FIGURE 1 shows a stator with stamped salient poles 1, 2, 3, 4 between the pole edges of which the pole bridges 11 are inserted. As a single-phase motor it is wired according to the circuit arrangement shown in FIGURE 1a with winding parts 1', 3' as main phase and the winding parts 2', 4' as auxiliary phase.

In the case of the stator according to the invention illustrated in FIGURE 2, which is also constructed as stator with stamped-on poles and pole bridges inserted between the edges of the poles, the individual poles are designated by 5, 6, 7, 8, 9, 10 and the pole wedges by 11. In the Steinmetz circuit arrangement according to FIGURE 2a, wherein each two opposite poles are in each case connected in opposition with the winding parts 5', 8' and 7', 10' and 6', 9' and interlinked in delta, the motor is given a four-pole rotary field.

According to FIGURE 2b, however, wherein each two opposite poles are placed in series according to the principle of the Dahlander connection with the winding parts 5', 8' and 7', 10' and 6', 9', a two-pole rotary field is produced.

In the case of the stator illustrated in FIGURE 3 the constructional principle known per se is used in which a pole star 12 is inserted in a yoke ring 13. The connecting bridges 14 between the poles are graduated in steps in order to obtain a certain leakage flux for improving the magnetic properties.

FIGURE 5 shows another constructional design of a stator resembling the construction without pole bridges known from shaded pole motors. The poles are stamped-on as in FIGURE 2 but the edges of the poles merge into pole tips. These converge leaving only a slot for introducing the winding. It can only be superficially compared with a groove slot. The slots are here closed according to the invention with ferromagnetic slot wedges 17. The recesses 18 in the pole faces, which cause a widening of the air gap, serve also for improving the magnetic properties.

Finally the third possibility of constructional design and improving the magnetic properties is illustrated in FIGURE 4 in the form of a stator according to the invention with one pair of poles, in which a laminated pole ring 15 is inserted between the pole faces, the parts of this ring extending from pole to pole varying in wall thickness continuously; again with the object of improving the magnetic properties.

It will thus be seen that, in accordance with the present invention, there is provided a stator for small three-phase motors with polyphase windings, which stator comprises a yoke ring and 3 salient poles per electric pole pair, which salient poles protrude inwardly from the ring, there being $m$ electric pole pairs with $m$ being a positive integer. Also, there are provided the above-described magnetically conductive pole bridges which are disposed between adjacent ones of the poles.

From an electrical point of view, the use of the three-phase system on the small motor with salient poles and pole bridges from pole to pole, presents the advantage which must not be underestimated, that the effective pole width is 66% of the pole pitch as compared with 50% in the case of the two-phase system. This fact is synonymous with an improved winding factor. Moreover, when using the Steinmetz circuit arrangement, the zero component automatically disappears, contrary to the circuit arrangement with the two-phase system with main and auxiliary phases, so that harmonics resultant of a three-unit pole are avoided. The pole changing is possible with a simple Dahlander circuit arrangement.

It will be understood that this invention is susceptible to modification in order to adapt it to different usages and conditions and, accordingly, it is desired to comprehend such modifications within this invention as may fall within the scope of the appended claims.

What we claim is:

1. Stator for small three phase motors with polyphase winding comprising: a yoke ring; 3 salient poles per electric pole pair, inwardly protruding from said ring, there being $m$ electric pole pairs with $m$ being a positive integer; and magnetically conductive pole bridges disposed between adjacent ones of said poles.

2. Stator according to claim 1, comprising a yoke, and a pole star formed by said poles with said pole bridges and being inserted in said yoke.

3. Stator according to claim 1, comprising a laminated pole ring forming said pole bridges and being inserted between said poles.

4. Stator according to claim 1, wherein said pole bridges are provided with a narrow drop-in slot, and means for ferromagnetically closing the slot.

5. Stator according to claim 1, with an air gap under the pole core and said pole bridges being of different size so that the content of higher field harmonics remains as small as possible.

6. Stator for small three phase motors with a rotor and polyphase winding for connecting up with three-phase and single-phase alternating current supply mains comprising: an outer yoke ring; a plurality of salient poles protruding from said ring, there being 3 salient poles per electric pole pair and $m$ electric pole pairs with $m$ being a positive integer, and a plurality of magnetically conductive pole bridges disposed between adjacent ones of said poles, with the thickness of said pole bridges varying gradually from pole core to pole core, so that the useful flux under pole core and pole bridge passing over to said rotor is distributed substantially in sine-shape.

7. Stator for small three phase motors with a rotor and polyphase winding for connecting up with three-phase and single-phase alternating current supply mains, comprising: an outer yoke ring; a plurality of salient poles protruding from said ring, there being 3 salient poles per electric pole pair and $m$ electric pole pairs with $m$ being a positive integer; and a plurality of magnetically conductive pole bridges disposed between adjacent ones of said poles, with the thickness of each of said pole bridges decreasing in steps from any pole core towards the bridge center, so that the useful flux under pole core and pole bridge passing over to said rotor is distributed substantially in sine-shape.

References Cited by the Examiner

UNITED STATES PATENTS

| 471,155 | 3/1892 | Thomson | 310—220 |
| 1,689,188 | 10/1928 | Pohl et al. | 310—256 |
| 1,816,795 | 7/1931 | Pohl | 310—256 |
| 2,323,114 | 6/1943 | Bradford et al. | 310—218 |
| 2,451,633 | 10/1948 | Perrigo | 310—214 |
| 2,547,599 | 4/1951 | Roters | 310—258 X |
| 2,584,365 | 2/1952 | Palffy | 310—258 X |
| 2,711,008 | 6/1955 | Smith | 310—259 |
| 2,723,359 | 11/1955 | Feiertag | 310—254 |
| 2,804,680 | 9/1957 | Flagg | 310—258 X |
| 2,981,856 | 4/1961 | Ludemann et al. | 310—90 |

FOREIGN PATENTS

| 286,765 | 7/1914 | Germany. |
| 147,913 | 9/1931 | Switzerland. |

MILTON O. HIRSHFIELD, *Primary Examiner.*

G. P. HASS, G. SIMMONS, *Assistant Examiners.*